United States Patent [19]

Bramwell

[11] Patent Number: 4,618,741
[45] Date of Patent: Oct. 21, 1986

[54] ADAPTOR FOR CONNECTING RACEWAY TRUNKING TO A BOX FOR ELECTRICAL COMPONENTS, AND THE ADAPTOR AND BOX IN COMBINATION

[75] Inventor: David W. Bramwell, Prestatyn, United Kingdom

[73] Assignee: EGA Limited, United Kingdom

[21] Appl. No.: 628,725

[22] Filed: Jul. 9, 1984

[51] Int. Cl.[4] .......................... H02G 3/04; H02G 3/06
[52] U.S. Cl. ..................................... 174/68 C; 138/92
[58] Field of Search ............... 174/48, 49, 68 C, 70 C, 174/71 R, 72 C, 97, 101; 52/221, 287; 138/92; 339/23, 61 C

[56] References Cited

U.S. PATENT DOCUMENTS

| | | | |
|---|---|---|---|
| 3,592,956 | 7/1971 | Fork | 174/49 |
| 3,654,379 | 4/1972 | Rodgers | 174/101 X |
| 3,721,762 | 3/1973 | Gooding | 174/48 |
| 3,725,568 | 4/1973 | Stanley | 174/48 |
| 4,092,486 | 5/1978 | Myers | 174/48 |

FOREIGN PATENT DOCUMENTS

| | | |
|---|---|---|
| 569697 | 6/1945 | United Kingdom . |
| 773605 | 5/1957 | United Kingdom . |
| 1095164 | 12/1967 | United Kingdom . |
| 1369103 | 10/1974 | United Kingdom . |

OTHER PUBLICATIONS

*Wiremold Catalog and Wiring Guide No. 18*, published by The Wiremold Company, Hartford, Conn., p. 64.

Primary Examiner—Laramie E. Askin
Attorney, Agent, or Firm—Andrus, Sceales, Starke & Sawall

[57] ABSTRACT

An adaptor for connecting raceway trunking (5) to a box (1) for electrical components comprises a channel member (4) through which raceway trunking may pass having a hole (6) to register with an aperture or knock-out portion (2) of the box when the adaptor is attached to the side of the box. Integral, outwardly extending, snap-fitting tabs (9) are positioned around the hole (6) in the channel member (4) for attaching the channel member (4) to the box (1) at the aperture or knock-out portion (2) of the box.

14 Claims, 2 Drawing Figures

ADAPTOR FOR CONNECTING RACEWAY TRUNKING TO A BOX FOR ELECTRICAL COMPONENTS, AND THE ADAPTOR AND BOX IN COMBINATION

BACKGROUND OF THE INVENTION

Field of the Invention

This invention relates to the attachment of trunking intended to contain electric wiring to boxes into which the wiring is to be run. Such boxes may contain a variety of electrical components, such as switches, and may be mounted in a wide variety of locations, for example in a skirting board or on the wall of a room. Wiring is commonly led to the box through raceway trunking which comprises a generally tubular duct and the wiring enters the box from the raceway trunking through a hole in the box which may be formed in the wall of the box.

Boxes to accommodate switches are normally square or rectangular and are conventionally mounted with their walls horizontal and vertical, the switch itself being mounted on a plate closing the box with its operating member movable in the vertical direction between on and off positions. With existing types of connection between the raceway trunking and the box, the open end of the raceway trunking duct abuts the wall of the box so that a separate termination of the raceway trunking is required for each box in an installed circuit. When a large number of power or light switches are installed in a building, the number of separate raceway trunking terminations is correspondingly large, increasing the cost and complexity of the installation.

The present invention is intended to provide means for connecting raceway trunking to boxes for electrical components which is flexible in that the raceway trunking can approach the box from a plurality of different directions and that there is no necessity to provide a separate termination for each box of an installation.

SUMMARY OF THE INVENTION

According to one aspect of the invention, there is provided an adaptor for connecting raceway trunking to a box for electrical components, comprising an open-ended, elongate channel member to contain a length of raceway trunking running therethrough or thereinto, a side wall of the channel member having a hole and the channel member having integral, snap-fitting means for attaching it to a box with the hole in registry with a corresponding aperture in the wall of the box. The hole is preferably adjacent one end of the channel member.

When the adaptor is connected to the box, it is positioned alongside the wall of the box and raceway trunking may pass into the adaptor from either end. The raceway trunking may terminate at the adaptor, in which case it passes through only one end of the member and the open end of the member can be closed off, for example by a planking plate. Alternatively, the raceway trunking may extend beyond the adaptor at both ends, enabling the box to be connected to the raceway trunking at any point along the length of the raceway trunking.

The attaching means may comprise tabs positioned around the hole in the member. The tabs extending into the aperture in the box when the adaptor is positioned beside the box, the tabs having outwardly turned ends to form a snap fit within the aperture so that the adaptor is held firmly against the side of the box. In addition to the tabs, the hole in the adaptor may be surrounded by a flange extending into a corresponding shoulder of the box aperture to locate the adaptor relative to the aperture of the box.

According to another aspect of the invention, there is provided in combination, a box for electrical components and an adaptor for connecting raceway trunking to the box, the adaptor comprising an open-ended elongate channel member to contain a length of raceway trunking running therethrough or thereinto, a side wall of the channel member having a hole and the channel member having integral, snap-fitting means for attaching it to the box; and the box comprising walls and an aperture in at least one of the walls of the box, said aperture being intended to be in registry with the hole in the channel member when the adaptor is attached to the box.

The length of the adaptor may be substantially the same as that of the wall so that both ends of the adaptor are flush with the box wall ends. This feature allows the box and the adaptor to be assembled together in a tidy, uncluttered manner with a minimum of protrusions beyond the assembly.

The box may be provided with such a wall aperture or knock-out portion on some or all of its sides and may be adjacent one end or intermediate the ends so that the adaptor may be attached to a choice of sides and the raceway trunking may approach the box from different directions. The box walls may have further holes or knock-out portions in addition to those adjacent said one end to give an even greater choice of positions at which the adaptor may be attached to the box.

BRIEF DESCRIPTION OF THE DRAWINGS

An adaptor arrangement according to one embodiment of the invention will now be described by way of example with reference to the accompanying drawings, in which.

DESCRIPTION OF PREFERRED EMBODIMENT

Figure 1:
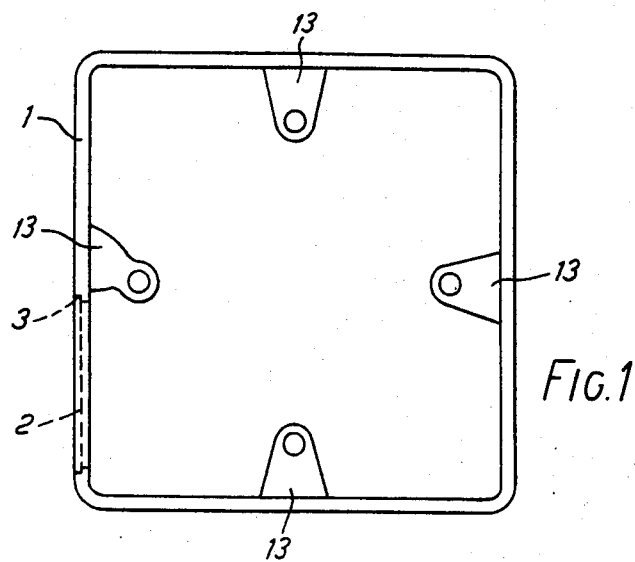
FIG. 1 is a plan view of a box for housing electrical components such as wall switches.
Figure 2:
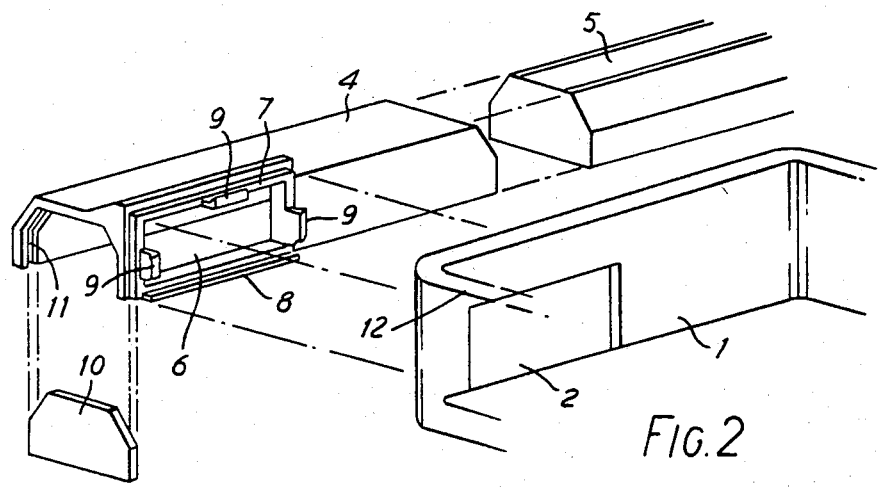
FIG. 2 is a perspective view of a side adaptor in relation to a box and a length of raceway trunking to be attached thereto.

In FIGS. 1 and 2 only the wall 1 of the box is shown, terminals and other items inside the box being omitted. The wall is provided with a rectangular aperture 2 of which the side and upper edges are provided with a shoulder 3 on the outside of the wall. The aperture is positioned adjacent a corner of the box as shown. If desired, more than one wall may be provided with similar apertures, either adjacent a corner or intermediate two corners, and the apertures may be formed by knock-out wall portions of reduced thickness so that the aperture may be obtained by knocking out the appropriate portion as required on site. The box has four pillars 13, symmetrically arranged, having threaded holes to allow mounting of a standard switch plate by screws passing through the plate.

The adaptor comprises an elongate channel member 4 having an interior cross-section such that a length of standard raceway trunking 5 may be inserted in and slid along the interior of member 4. The side wall of one end of member 4 has a rectangular hole 6 of dimensions corresponding to aperture 2 and hole 6 is surrounded by an integral flange 7 extending from the wall of member 4 to fit without significant play in shoulder 3 of the box. Flange 7 carries sill 8 to fit in a corresponding slot in the wall 1 of the box and also three tabs 9 of which the edges are turned outwardly with respect to the hole. When the adaptor is applied to the box with the flange engaging the shoulder 3, the tabs pass through aperture 2 and form a snap fit with wall 1, thus holding the adaptor in place.

Either end of the adaptor may be closed by a blanking plate 10 which is inserted in a groove 11 inside the adaptor; similar grooves are provided at both ends.

The hole 6 in the adaptor is positioned adjacent one end of the adaptor and is such that the end surface of the adaptor is flush with the side wall 12 of the box. The length of the adaptor is the same as that of wall 1 so that the adaptor clips onto the side of the box to form a neat assembly without objectionable protrusions.

The arrangement described above allows raceway trunking to be connected to the box in several ways. The raceway trunking may enter the adaptor from either end and either terminate at the other end, which will be closed by the blanking plate, or extend beyond both ends so that the adaptor is positioned part way along the raceway trunking. A hole is cut in the raceway trunking as required to allow wires to pass from the raceway trunking through aperture 2 and hole 6. When the box is mounted on the skirting of a room or a wall, the raceway trunking leading to it may be horizontal or vertical and it may terminate at the box or continue beyond. The side adaptor described above, with a hole in the side of the box at the appropriate location, allows a standard type of box to be used easily in any of these situations.

The box described above has an aperture 2 adjacent the end of one wall so that the end of the adaptor is flush with side wall 12. The adaptor may also be used with boxes having additional apertures or knock-outs at other positions on the box wall, so that the adaptor end is no longer flush with the wall end when used with these apertures.

I claim:

1. An adaptor for connecting raceway trunking to a box for electrical components, comprising an open-ended, elongate channel member to contain a length of raceway trunking therethrough or thereinto, a side wall of the channel member having a hole and the channel member having integral, snap-fitting means for attaching it to a box with the hole in registry with a corresponding aperture in a wall of the box.

2. An adaptor according to claim 1, in which the hole is adjacent one end of the channel member.

3. An adaptor according to claim 1 or 2, provided with a removable blanking plate for closing an end of the channel member.

4. An adaptor according to claim 1 or 2, provided with a removable blanking plate for closing an end of the channel member and in which at least one end of the channel member has an internal groove to receive the blanking plate.

5. An adaptor according to claim 1, in which said integral snap-fitting means comprises tabs positioned around the hole and extending outwardly of the channel member.

6. An adaptor according to claim 5, in which the tabs have outwardly turned ends forming the snap fit, the tabs being for snap-fitting within the aperture of a box.

7. An adaptor according to claim 5 or 6, in which the hole is surrounded by an outwardly extending flange arranged to extend into the aperture of a box.

8. In combination, a box for electrical components and an adaptor for connecting raceway trunking to the box, the adaptor comprising an open-ended, elongate channel member to contain a length of raceway trunking running therethrough or thereinto, a side wall of the channel member having a hole and the channel member having integral, snap-fitting means for attaching it to the box; and the box comprising walls and an aperture in at least one of the walls of the box, said aperture being intended to be in registry with the hole in the channel member when the adaptor is attached to the box.

9. A combination according to claim 8, in which the length of the adaptor is substantially the same as that of said at least one wall of the box.

10. A combination according to claim 8, in which more than one of the walls of the box has a said aperture.

11. A combination according to claim 8, in which said at least one wall of the box is provided with an aperture additional to said aperture adjacent one end of said at least one wall.

12. In combination, a box for electrical components and an adaptor for connecting raceway trunking to the box, the adaptor comprising an open-ended, elongate channel member to contain a length of raceway trunking running therethrough or thereinto, a side wall of the channel member having a hole and the channel member having integral, snap-fitting means for attaching it to the box; and the box comprising walls and a knock-out portion capable of forming an aperture in at least one of the walls of the box, the aperture when so formed being intended to be in registry with the hole in the channel member when the adaptor is attached to the box.

13. A combination according to claim 12, in which more than one of the walls of the box has a said knock-out portion capable of forming a said aperture.

14. A combination according to claim 12, in which said at least one wall of the box is provided with a knock-out portion additional to said knock-out portion adjacent one end of said at least one wall.

* * * * *

UNITED STATES PATENT AND TRADEMARK OFFICE
CERTIFICATE OF CORRECTION

PATENT NO. : 4,618,741

DATED : October 21, 1986

INVENTOR(S) : DAVID W. BRAMWELL

It is certified that error appears in the above-identified patent and that said Letters Patent is hereby corrected as shown below:

In Column 1, line 58, delete "planking" and insert --blanking--.

In Claim 1, column 3, line 47, after "trunking" and before "therethrough" insert --running--.

Signed and Sealed this

Thirteenth Day of January, 1987

*Attest:*

DONALD J. QUIGG

*Attesting Officer*   *Commissioner of Patents and Trademarks*